(12) United States Patent
Kawashima

(10) Patent No.: US 9,487,888 B2
(45) Date of Patent: Nov. 8, 2016

(54) CORD FOR REINFORCING RUBBER ARTICLES, AND PNEUMATIC TIRE

(75) Inventor: Keisuke Kawashima, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 322 days.

(21) Appl. No.: 13/983,352

(22) PCT Filed: Feb. 2, 2012

(86) PCT No.: PCT/JP2012/000718
§ 371 (c)(1),
(2), (4) Date: Aug. 21, 2013

(87) PCT Pub. No.: WO2012/105268
PCT Pub. Date: Aug. 9, 2012

(65) Prior Publication Data
US 2013/0319594 A1   Dec. 5, 2013

(30) Foreign Application Priority Data

Feb. 4, 2011 (JP) ................................. 2011-023343

(51) Int. Cl.
*B60C 9/13* (2006.01)
*D02G 3/00* (2006.01)
*D02G 3/48* (2006.01)
*D02G 3/28* (2006.01)
*B60C 9/00* (2006.01)

(52) U.S. Cl.
CPC ................ *D02G 3/28* (2013.01); *B60C 9/005* (2013.04); *B60C 9/0042* (2013.04); *D02G 3/48* (2013.01); *B60C 9/13* (2013.01); *D10B 2201/00* (2013.01); *D10B 2331/02* (2013.01); *Y10T 152/10855* (2015.01)

(58) Field of Classification Search
CPC ............. B60C 9/13; D02G 3/00; D02G 3/48
See application file for complete search history.

(56) References Cited

U.S. PATENT DOCUMENTS 3,831,368 A * 8/1974 Glowacki ........................ 57/239
2005/0260406 A1   11/2005 Cataldo et al.

FOREIGN PATENT DOCUMENTS

| CN | 1834316 A | 9/2006 |
|---|---|---|
| CN | 101200827 A | 6/2008 |
| CN | 101305120 A | 11/2008 |
| CN | 101379241 A | 3/2009 |
| EP | 2221413 A1 | 8/2010 |
| GB | 815053 * | 6/1959 |
| GB | 823866 * | 11/1959 |

(Continued)

OTHER PUBLICATIONS

International Search Report for PCT/JP2012/000718 dated May 1, 2012.

(Continued)

*Primary Examiner* — Justin Fischer
(74) *Attorney, Agent, or Firm* — Sughrue Mion, PLLC

(57) ABSTRACT

A cord for reinforcing rubber articles according to the present invention is formed by a thread with ply-twisted cellulose fiber twisted with a thread of ply-twisted nylon fiber. The ply twist number of the nylon fiber is less than the ply twist number of the cellulose fiber. A pneumatic tire according to the present invention uses the cord for reinforcing rubber articles according to the present invention in a ply cord of the carcass.

8 Claims, 2 Drawing Sheets

(56) References Cited

FOREIGN PATENT DOCUMENTS

| | | | |
|---|---|---|---|
| JP | 05195359 A | | 8/1993 |
| JP | 2004-276840 A | | 10/2004 |
| JP | 2005-343301 A | | 12/2005 |
| JP | 2006-290164 A | | 10/2006 |
| JP | 2009-149282 A | | 7/2009 |
| JP | 2010-173612 A | | 8/2010 |
| WO | WO 02/16682 | * | 2/2002 |
| WO | 2009028918 A2 | | 3/2009 |
| WO | 2011/024815 A1 | | 3/2011 |

OTHER PUBLICATIONS

Communication dated May 12, 2015, issued by the State Intellectual Property Office of the People's Republic of China in corresponding Chinese Application No. 201280014961.7.

* cited by examiner

CORD FOR REINFORCING RUBBER ARTICLES, AND PNEUMATIC TIRE

CROSS REFERENCE TO RELATED APPLICATIONS

This application is a National Stage of International Application No. PCT/JP2012/000718 filed Feb. 2, 2012, claiming priority based on Japanese Patent Application No. 2011-023343 filed Feb. 4, 2011, the contents of all of which are incorporated herein by reference in their entirety.

TECHNICAL FIELD

The present invention relates to a cord for reinforcing rubber articles and to a pneumatic tire using the cord in a ply cord of a carcass.

BACKGROUND ART

Rayon fiber, a highly rigid fiber, is used in carcass plies in pneumatic tires, which are a typical rubber article, and in particular in motorcycle tires, in order to achieve high steering stability. Furthermore, lyocell fiber, which is also a cellulose fiber, is more rigid than rayon and thus may be used to obtain even higher steering stability.

For example, JP2006-290164A (PTL 1) discloses a technique for improving steering stability by using rayon as the fiber in the carcass cords of a motorcycle tire.

CITATION LIST

Patent Literature

PTL 1: JP2006-290164A

SUMMARY OF INVENTION

While cellulose fiber such as rayon fiber, lyocell fiber, or the like is highly rigid, one problem is that these fibers have inferior fatigue resistance. Lyocell fiber has especially inferior fatigue resistance.

In particular, the carcass ply in a motorcycle tire often has a bias structure in which ply cords inclined with respect to the tire circumferential direction are alternately overlaid. Repeated input to the intersection between layers of ply cords causes the problem of a fatigue fracture easily occurring.

Since ply cords formed from cellulose fiber have poor fatigue resistance, it has been necessary to place the carcass at an angle of 80° to 90° with respect to the tire circumferential direction in a bias structure in order to reduce fretting wear of the intersection between ply cords.

In particular, when using cords made from cellulose fiber and placed in the ply at an angle of 80° to 90° with respect to the tire circumferential direction in a tire having a cap structure, the cords suffer fatigue due to compressive strain, leading to the problem of lower durability of the tire.

Therefore, it is an object of the present invention to provide a cord for reinforcing rubber articles that has improved fatigue resistance while maintaining high rigidity, and a highly durable pneumatic tire that uses the cord in a ply cord of the carcass.

After repeated examination in order to resolve the above problems, the inventors discovered that using a cord with nylon fiber having excellent fatigue resistance mixed in with highly rigid cellulose fiber can make the high rigidity of cellulose fiber compatible with the fatigue resistance of nylon fiber. Specifically, the inventors further discovered that, in order to achieve this compatibility, it is necessary to appropriately set a condition on the ply twist number of each fiber.

Primary features of a pneumatic tire according to the present invention are as follows.

(1) A cord for reinforcing rubber articles, including a thread of ply-twisted cellulose fiber twisted with a thread of ply-twisted nylon fiber, wherein a ply twist number of the nylon fiber is less than a ply twist number of the cellulose fiber.

(2) The cord for reinforcing rubber articles according to (1), wherein the following relationship is satisfied:

$$0 \leq n/m \leq 0.75$$

where n is the ply twist number of the nylon fiber (twists/10 cm), m is the ply twist number of the cellulose fiber (twists/10 cm), and n/m is a ratio of the ply twist number of the nylon fiber to the ply twist number of the cellulose fiber.

(3) The cord for reinforcing rubber articles according to (1) or (2), wherein the ply twist number of the cellulose fiber is at least 32 (twists/10 cm).

(4) The cord for reinforcing rubber articles according to any one of (1) to (3), wherein the ply twist number of the nylon fiber is at most 30 (twists/10 cm).

(5) The cord for reinforcing rubber articles according to any one of (1) to (4), wherein a content of nylon fiber in the cord is in a range from 17% to 45%.

(6) The cord for reinforcing rubber articles according to any one of (1) to (5), including at least one ply-twisted cellulose fiber and at least one ply-twisted nylon fiber.

(7) The cord for reinforcing rubber articles according to any one of (1) to (6), wherein a fineness of the cellulose fiber is from 500 dtex to 3000 dtex, and a fineness of the nylon fiber is from 400 dtex to 3000 dtex.

(8) The cord for reinforcing rubber articles according to any one of (1) to (7), wherein the cord is positioned at an angle between 60° and 90° with respect to a tire circumferential direction.

(9) A pneumatic tire using the cord for reinforcing rubber articles according to any one of (1) to (8) in a ply cord of a carcass.

(10) The pneumatic tire according to (9), comprising a cap structure reinforced by a highly elastic cord provided along a tire circumferential direction.

According to the present invention, a cord having both high rigidity and fatigue resistance, as well as a pneumatic tire that uses the cord in a ply cord of the carcass, can be provided by using cellulose fiber and nylon fiber together under an appropriate condition on the ply twist number.

BRIEF DESCRIPTION OF DRAWINGS

The present invention will be further described below with reference to the accompanying drawings, wherein.

DESCRIPTION OF EMBODIMENTS

Figure 1:
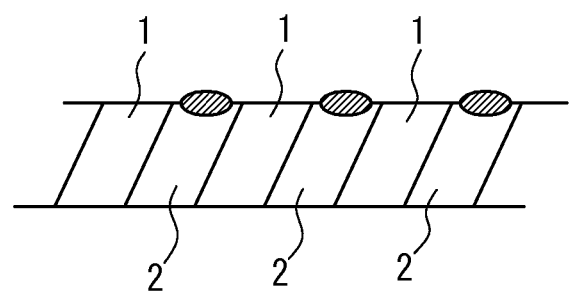
FIG. 1 illustrates the cable twist when the ply twist number is equivalent for nylon and cellulose.
Figure 2:
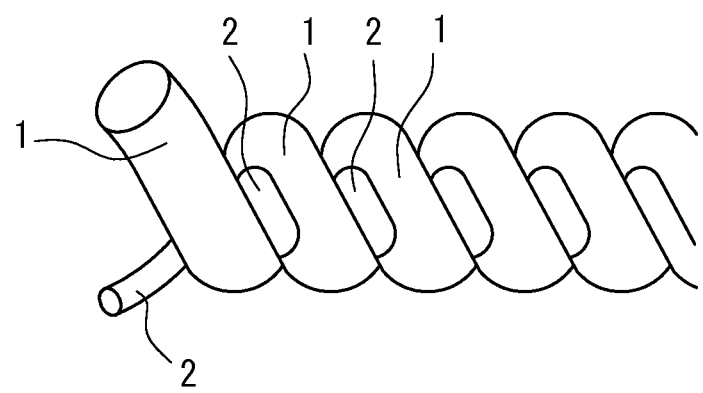
FIG. 2 illustrates the cable twist when the ply twist number for cellulose is greater than the ply twist number for nylon.
Figure 3:
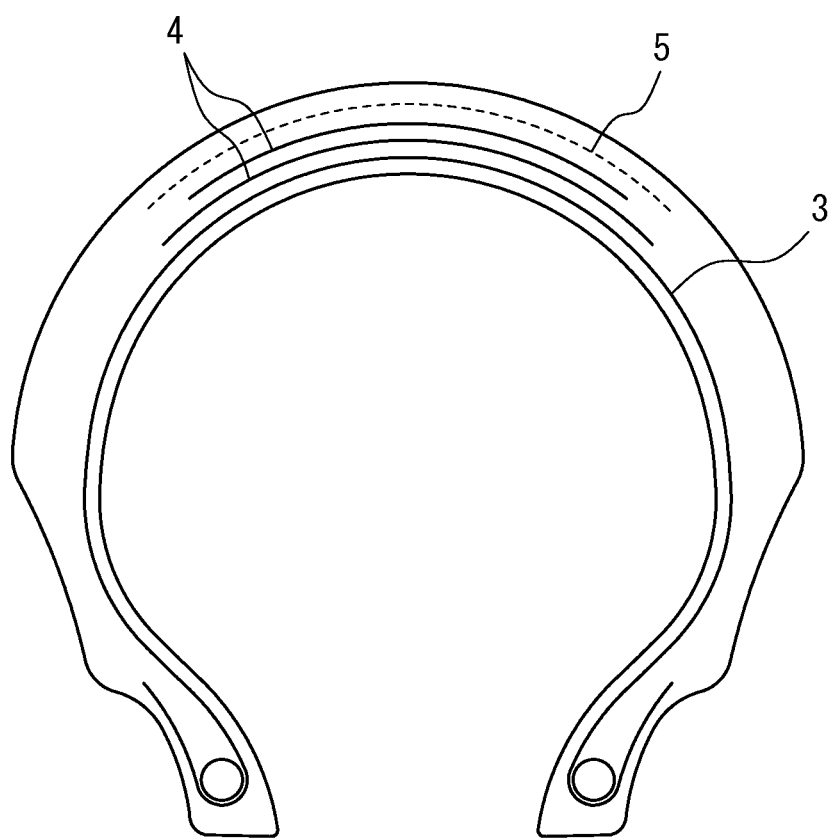
FIG. 3 is a cross-sectional diagram of a tire having a cap structure.

The following describes the present invention in detail with reference to the drawings. FIGS. 1 through 3 illustrate the cord used in a carcass ply of a pneumatic tire according to an embodiment of the present invention.

In the present embodiment, in order to make high rigidity compatible with fatigue resistance, a cord having a mix of highly rigid cellulose fiber and nylon fiber having excellent fatigue resistance is used.

FIG. 1 shows the case when the ply twist number is 30 (twists/10 cm) for nylon fiber and cellulose fiber.

In this case, nylon fiber 2 and cellulose fiber 1 are arranged alternately in one cord, and when compressive strain is placed on the cord, the compressive strain is exerted uniformly on the nylon fiber and the cellulose fiber. Therefore, even though the cord contains nylon fiber and cellulose fiber twisted together, the compressive strain exerted on the cellulose fiber, which has inferior compression fatigue resistance, does not change. Accordingly, in this case the fatigue resistance of the cord does not improve.

Note that the twist number is expressed as a value per 10 cm of thread in compliance with JIS L 1017 (1983).

In the present embodiment, in order to make the high rigidity of cellulose fiber compatible with the excellent fatigue resistance of nylon fiber, it is crucial that the ply twist number of cellulose be greater than the ply twist number of nylon. For example, the ply twist number of nylon is set to 5 (twists/10 cm), and the ply twist number of cellulose is set to 30 (twists/10 cm).

FIG. 2 shows a thread of ply-twisted cellulose fiber and a thread of ply-twisted nylon fiber twisted together (cable-twisted) in the opposite direction from the ply twist.

As illustrated in FIG. 2, in the resulting structure, the cellulose fiber is located further outwards in the cord, whereas the nylon fiber is located further inwards in the cord.

By adopting the above structure, the cellulose fiber is located further outside than the nylon fiber, and therefore when compressive strain is exerted on the twisted cord, the majority of the strain is exerted on the nylon fiber.

Accordingly, less compressive strain is exerted on the cellulose fiber, which has inferior compression fatigue resistance, thereby improving the fatigue resistance of the entire twisted cord.

For example, the following relationship is preferably satisfied:

$$0 \leq n/m \leq 0.75$$

where n is the ply twist number of the nylon fiber (twists/10 cm), m is the ply twist number of the cellulose fiber (twists/10 cm), and n/m is the ratio of the ply twist number of the nylon fiber to the ply twist number of the cellulose fiber.

The reason is that if the above ratio is set to be greater than 0.75, the effect of twisting the fibers together so that the cellulose fiber is located further outside than the nylon fiber is no longer sufficiently obtained.

Even if the above ratio is 0, the fatigue resistance improves as compared to a cord of only cellulose fiber.

Nevertheless, in order to prevent the compressive strain on the nylon fiber from becoming too large, the above ratio is more preferably at least 0.3.

The ply twist number of cellulose is preferably at least 32 (twists/10 cm). The reason is that for a number less than 32 (twists/10 cm), the effect of twisting the fibers together so that the cellulose fiber is located further outside than the nylon fiber is no longer sufficiently obtained.

The ply twist number of nylon is preferably at most 30 (twists/10 cm). The reason is that for a number greater than 30 (twists/10 cm), the fatigue resistance of the nylon fiber improves, yet the rigidity of the twisted cord is reduced.

The content of nylon fiber in the cord is preferably in a range from 17% to 45%. The reason is that for a nylon fiber content of less than 17%, the cellulose fiber cannot sufficiently receive the cushioning effect of the nylon fiber, and therefore the fatigue resistance cannot be improved. At a content of greater than 45%, the proportion of nylon fiber in the cord grows high, and therefore the elastic modulus of the nylon fiber as compared to the cellulose fiber decreases, preventing maintenance of both the rigidity of the cord itself and steering stability.

Note that the "content" refers to the percent by weight of nylon fiber with respect to the weight of the entire cord.

Furthermore, in the cord, the fineness of the cellulose fiber is preferably from 500 dtex to 3000 dtex, and the fineness of the nylon fiber is preferably from 400 dtex to 3000 dtex.

The reason is that if the fineness of the cellulose fiber is less than 500 dtex and the fineness of the nylon fiber is less than 400 dtex, the breaking strength is too low, whereas if the fineness of the cellulose fiber and the nylon fiber is greater than 3000 dtex, the weight becomes too great.

Furthermore, a tire using the cord of the present embodiment in the carcass has excellent fatigue resistance, and therefore the cord may be positioned at an angle between 60° and 90° with respect to the tire circumferential direction.

Additionally, the cord according to the present invention is highly rigid and has excellent fatigue resistance and therefore is preferably used in a ply cord of the carcass in a pneumatic tire.

For example as illustrated in FIG. 3, a pneumatic tire has a structure with a carcass 3 extending toroidally between a pair of bead cores and a belt positioned outwards from the carcass 3 in the tire radial direction.

The cord according to the present invention is highly rigid and has excellent fatigue resistance, and therefore using the cord in a ply cord of the carcass in a pneumatic tire achieves a tire with excellent steering stability and durability.

In particular, the cord according to the present invention is preferably used in a tire having low durability due to compressive strain and having a cap structure as illustrated in FIG. 3.

Note that the cap structure refers to a structure having a belt reinforcing layer 5 that is positioned outwards from a belt 4 in the tire radial direction, extends at least across the entire width of the belt, and is formed by organic fiber cords embedded in rubber and aligned substantially parallel to the tire circumferential direction, as illustrated in FIG. 3.

Examples

Next, in order to confirm a difference in durability between a conventional tire and the tire according to the present invention, a test in a drive drum was performed. As Inventive Examples 1 to 7 and Comparative Examples 1 to 5, tires were produced using, in the ply cord of the carcass, a cord with cellulose fiber (rayon or lyocell) and nylon twisted together in the opposite direction from the ply twist. As Conventional Examples 1 to 4, tires were prepared using a cord formed only from nylon in the carcass ply.

In order to check durability in this test, tires having a tire size of 180/55R17 were mounted on an applicable rim, and air pressure of 140 kPa was applied. A load of 4.58 kN was then applied to each tire, and a drum test was performed by driving at a speed of 81 km/h. Tables 1 to 3 show the results of comparing Inventive Examples 1 to 7, Comparative Examples 1 to 5, and Conventional Examples 1 to 4, as well as the specifications of each tire.

In Tables 1 to 3, the INDEX for the Inventive Examples indicating the durability at low internal pressure is calculated by the following equation, with the tire of Conventional Example 1 being assigned a value of 100.

(INDEX of Inventive Example)=((Driving distance for Inventive Example tire)/(Driving distance for tire of Conventional Example 1))×100

Note that a larger INDEX indicates better durability.

Furthermore, the INDEX for the steering stability of the Inventive Examples was calculated by a comprehensive assessment based on the driving impressions of a test driver who drove an actual vehicle on a test course, with the tire of Conventional Example 1 being assigned a value of 100. A larger value is better. Note that the Comparative Examples were assessed in the same way.

TABLE 1

|  | Conv. Ex. 1 | Conv. Ex. 2 | Inv. Ex. 1 | Inv. Ex. 2 | Inv. Ex. 3 | Inv. Ex. 4 | Inv. Ex. 5 | Comp. Ex. 1 | Comp. Ex. 2 | Comp. Ex. 3 |
|---|---|---|---|---|---|---|---|---|---|---|
| Cord material 1 | rayon | lyocell | lyocell | lyocell | lyocell | lyocell | lyocell | lyocell | lyocell | lyocell |
| Structure of cord material 1 | 1840/2 | 1840/2 | 1840/2 | 1840/2 | 1840/2 | 1840/2 | 1840/2 | 1840/2 | 1840/2 | 1840/2 |
| Cord material 2 | — | — | nylon | nylon | nylon | nylon | nylon | nylon | nylon | nylon |
| Structure of cord material 2 | — | — | 1400/1 | 1400/1 | 1400/1 | 1400/1 | 1400/1 | 1400/1 | 1400/1 | 1400/1 |
| Cable twist number (twists/10 cm) | 39 | 39 | 39 | 39 | 39 | 39 | 39 | 39 | 39 | 39 |
| ply twist number m of cord material 1 (twists/10 cm) | 39 | 39 | 39 | 39 | 39 | 39 | 32 | 30 | 25 | 39 |
| ply twist number n of cord material 2 (twists/10 cm) | — | — | 5 | 16 | 26 | 35 | 25 | 39 | 28 | 39 |
| n/m | — | — | 0.13 | 0.41 | 0.67 | 0.90 | 0.78 | 1.30 | 1.12 | 1 |
| Durability when driving at low internal pressure (INDEX) | 100 | 85 | 120 | 108 | 105 | 101 | 102 | 95 | 85 | 95 |
| Steering stability (INDEX) | 100 | 120 | 102 | 105 | 107 | 109 | 108 | 115 | 117 | 110 |

Here, the notation x/y for the structure of the cord material (for example, 1840/2) indicates the twisting of y fibers of fineness x (dtex).

TABLE 2

|  | Inv. Ex. 3 | Comp. Ex. 4 | Comp. Ex. 5 |
|---|---|---|---|
| Cord material 1 | lyocell | lyocell | lyocell |
| Structure of cord material 1 | 1840/2 | 1840/2 | 2440/2 |
| Cord material 2 | nylon | nylon | nylon |
| Structure of cord material 2 | 1400/1 | 2100/2 | 940/1 |
| Cable twist number (twists/10 cm) | 39 | 39 | 39 |
| Ply twist number m of cord material 1 (twists/10 cm) | 39 | 39 | 39 |
| Ply twist number n of cord material 2 (twists/10 cm) | 26 | 5 | 5 |
| Nylon content | 28 | 53 | 16 |
| Durability when driving at low internal pressure (INDEX) | 105 | 115 | 101 |
| Steering stability (INDEX) | 107 | 102 | 110 |

TABLE 3

|  | Conv. Ex. 3 | Conv. Ex. 4 | Inv. Ex. 6 | Inv. Ex. 7 |
|---|---|---|---|---|
| Cord material 1 | rayon | rayon | rayon | rayon |
| Structure of cord material 1 | 1840/2 | 1840/2 | 1840/2 | 1840/2 |
| Cord material 2 | — | — | nylon | nylon |
| Structure of cord material 2 | — | — | 1400/1 | 1400/1 |
| Cable twist number (twists/10 cm) | 39 | 39 | 39 | 39 |
| Ply twist number of cord material 1 (twists/10 cm) | 39 | 39 | 39 | 39 |
| Ply twist number of cord material 2 (twists/10 cm) | — | — | 5 | 5 |
| Carcass angle (°) | 80 | 75 | 75 | 65 |
| Durability when driving at low internal pressure (INDEX) | 100 | 90 | 110 | 102 |
| Steering stability (INDEX) | 100 | 105 | 105 | 110 |

A comparison of Conventional Example 1 and Conventional Example 2 in Table 1 shows that the tire adopting a cord using lyocell has worse durability than when using rayon.

On the other hand, a comparison of Inventive Examples 1 to 3 and Conventional Examples 1 and 2 shows that even though every Inventive Example uses both nylon and lyocell, the durability is better than that of Conventional Example 1, which only uses rayon. The steering stability is also excellent.

Furthermore, Table 1 shows that Inventive Examples 1 to 3, for which the relationship between the ply twist number of cord material 1 and of cord material 2 is within the preferred range, both the durability and steering stability are excellent, whereas Comparative Examples 1 and 2, for which the above relationship is not within the preferred range, the durability is worse than that of Conventional Example 1.

Furthermore, a comparison of Inventive Example 5 and Comparative Example 1 shows that Inventive Example 5, for which the ply twist number of lyocell, a cellulose fiber, is within the preferred range, has better durability than does Comparative Example 3, for which the ply twist number of lyocell is outside of the preferred range.

Furthermore, in Table 2, a comparison of Inventive Example 3, Comparative Example 4, and Comparative Example 5 shows that Inventive Example 3, for which the content of nylon is within the preferred range, has better steering stability than does Comparative Example 4, for which the content of nylon exceeds the preferred range, and has better durability than does Comparative Example 5, for which the content of nylon falls short of the preferred range.

Additionally, Table 3 shows that setting the angle of the carcass in a conventional tire, such as Conventional Example 4, to be less than 80° with respect to the tire circumferential direction causes durability to worsen, whereas Inventive Examples 6 and 7 according to the present invention have good durability and steering stability even when the angle of the carcass is set to be less than 80° with respect to the tire circumferential direction.

INDUSTRIAL APPLICABILITY

A cord for reinforcing rubber articles that makes rigidity compatible with durability, as well as a pneumatic tire that uses the cord in a ply cord of the carcass and that has high steering stability and excellent durability, can be manufactured and provided to the market.

REFERENCE SIGNS LIST

1: Cellulose
2: Nylon
3: Carcass
4: Belt
5: Belt reinforcing layer

The invention claimed is:

1. A pneumatic tire using a cord for reinforcing rubber articles in a ply cord of a carcass, the cord for reinforcing rubber articles comprising:
    a thread of ply-twisted cellulose fiber twisted with a thread of ply-twisted nylon fiber, wherein
    a ply twist number of the nylon fiber is less than a ply twist number of the cellulose fiber, and
    a content of nylon fiber in the cord is in a range from 17% to 45%.

2. The pneumatic tire according to claim 1, wherein the following relationship is satisfied:

$$0 \leq n/m \leq 0.75$$

where n is the ply twist number of the nylon fiber (twists/10 cm), m is the ply twist number of the cellulose fiber (twists/10 cm), and n/m is a ratio of the ply twist number of the nylon fiber to the ply twist number of the cellulose fiber.

3. The pneumatic tire according to claim 1, wherein the ply twist number of the cellulose fiber is at least 32 (twists/10 cm).

4. The pneumatic tire according to claim 1, wherein the ply twist number of the nylon fiber is at most 30 (twists/10 cm).

5. The pneumatic tire according to claim 1, comprising at least one ply-twisted cellulose fiber and at least one ply-twisted nylon fiber.

6. The pneumatic tire according to claim 1, wherein a fineness of the cellulose fiber is from 500 dtex to 3000 dtex, and a fineness of the nylon fiber is from 400 dtex to 3000 dtex.

7. The pneumatic tire according to claim 1, wherein the cord is positioned at an angle between 60° and 90° with respect to a tire circumferential direction.

8. The pneumatic tire according to claim 1, comprising a cap structure reinforced by a highly elastic cord provided along a tire circumferential direction.

* * * * *